US008559145B1

(12) United States Patent
Kireev et al.

(10) Patent No.: US 8,559,145 B1
(45) Date of Patent: Oct. 15, 2013

(54) SERIALIZER/DESERIALIZER FRONTEND

(75) Inventors: Vassili Kireev, Sunnyvale, CA (US); Jafar Savoj, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 61 days.

(21) Appl. No.: 13/332,678

(22) Filed: Dec. 21, 2011

(51) Int. Cl.
H02H 3/22 (2006.01)
(52) U.S. Cl.
USPC ............................................. 361/56; 361/111
(58) Field of Classification Search
USPC ..................................... 361/56, 111
See application file for complete search history.

(56) References Cited

U.S. PATENT DOCUMENTS

| 6,985,021 B1 * | 1/2006 | Zaliznyak et al. | 327/333 |
|---|---|---|---|
| 7,649,409 B1 * | 1/2010 | Koh et al. | 327/559 |
| 2003/0071673 A1 * | 4/2003 | Jordanger et al. | 327/333 |
| 2010/0066450 A1 * | 3/2010 | Palmer et al. | 330/261 |

OTHER PUBLICATIONS

Gondi, Srikanth et al., "Equalization and Clock and Data Recovery Techniques for 10-GB/s CMOS Serial-Link Receivers," *IEEE Journal of Solid-State Circuits*, Sep. 2007, pp. 1999-2011, vol. 42, No. 9, IEEE, Piscataway, New Jersey, USA.
Jung, Kwangmo et al., "Power Analysis and Optimization for High-Speed I/O Transceivers," *Proc. of the 54th IEEE International Midwest Symposium on Circuits and Systems*, Aug. 7, 2011, pp. 1-4, IEEE, Piscataway, New Jersey, USA.
Vadipour, Morteza et al., "A Low-Power 20-Gb/s CMOS 2:1 Multiplexer/Driver," *Proc. of the 28th European Solid-States Circuits Conference*, Sep. 24, 2002, pp. 231-234, Imec, Leuven, Belgium.

* cited by examiner

*Primary Examiner* — Danny Nguyen
(74) *Attorney, Agent, or Firm* — Gerald Chan; Lois D. Cartier

(57) ABSTRACT

A receiver frontend includes a first input junction for receiving a first input signal, a second input junction for receiving a second input signal, a first output junction, a second output junction, and circuitry configured to perform equalization on the first input signal and the second input signal to establish a first output signal with a desired frequency response at the first output junction, and to establish a second output signal with a desired frequency response at the second output junction, and perform common-mode voltage adjustment on a common-mode voltage associated with the first output signal and the second output signal.

18 Claims, 10 Drawing Sheets

SERIALIZER/DESERIALIZER FRONTEND

TECHNICAL FIELD

Embodiments described herein relate to a serializer/deserializer, and in particular, to devices and methods for implementing a receiver frontend for a serializer/deserializer.

BACKGROUND

A serializer/deserializer (SERDES) is a pair of functional blocks commonly used in high speed communications to perform on-chip conversion of a high speed serial data stream into multiple parallel low speed data lines. These blocks convert data between serial interfaces and parallel interfaces in each direction. Such data is received and transmitted in the form of electric signals. An electric signal received by a serializer/deserializer may undergo various forms of signal processing before being transmitted. As such, a serializer/deserializer may comprise a receiver frontend to accomplish various portions of the signal processing. Such processing may include equalization, common-mode voltage adjustment, electrostatic discharge (ESD) protection, and termination of signals, for example.

The term "equalization" refers to the process of boosting high frequency contents of an input signal in order to compensate for frequency dependent losses in the channel. The term "common-mode voltage adjustment" refers to the process of optimizing a common-mode voltage for a channel by supplying DC current to the channel. A system may be able to provide common-mode voltage adjustment for various ranges of common-mode voltages. The term "ESD protection" refers to a system's ability to protect against various electro-static events during chip and part assembly, and product use, that may potentially cause permanent damage to the circuits. "Termination of signals" refers to the process of reducing or eliminating unwanted reflected signals caused by an impedance mismatch between silicon chip inputs (e.g., pads) and the channel.

SUMMARY

In some embodiments, a receiver frontend includes an equalizer and a first voltage source. The equalizer is configured to perform equalization on an input channel comprising a first component connected between a first junction and a second junction. The first component includes a first capacitor in parallel with a first resistor, the first junction being configured to receive a first input signal associated with the input channel. The equalizer also includes a second component connected between a third junction and a fourth junction, the second component comprising a second capacitor in parallel with a second resistor, the third junction being configured to receive a second input signal associated with the input channel. The equalizer further includes a third resistor connected between a first node and the second junction, and a fourth resistor connected between the first node and the fourth junction. The equalizer is configured to provide a first output signal at the second junction, the first output signal corresponding to the first input signal, and to provide a second output signal at the fourth junction, the second output signal corresponding to the second input signal. The voltage source is coupled to the first node. The first voltage source is configured to adjust a common-mode voltage associated with the first output signal and the second output signal.

In one or more embodiments, a ratio between the first resistor and the third resistor, and a ratio between the second resistor and the fourth resistor may be the same.

In one or more embodiments, the receiver frontend may also include a second voltage source coupled to a second node, wherein the second voltage source is configured to adjust a common-mode voltage associated with the first input signal and the second input signal.

In one or more embodiments, the receiver frontend may also include a first termination resistor coupled between the first junction and a second node, wherein the first termination resistor is configured to terminate reflected signals associated with the first input signal, and a second termination resistor coupled between the third junction and the second node, wherein the second termination resistor is configured to terminate reflected signals associated with the second input signal.

In one or more embodiments, a combination of the first resistor, the third resistor, and the first termination resistor, may have a resistance value equal to R; a combination of the second resistor, the fourth resistor, and the second termination resistor, may have a resistance value equal to R; a combination of the first resistor and third resistor may have a resistance value greater than R; and a combination of the second resistor and fourth resistor may have a resistance value greater than R.

In one or more embodiments, the receiver frontend may also include a first electrostatic discharge component coupled to the first junction, wherein the first electrostatic discharge component is configured to provide a first low impedance path to ground for an electrostatic discharge associated with the first junction, and a second electrostatic discharge component coupled to the second junction, wherein the second electrostatic discharge component is configured to provide a second low impedance path to ground for an electrostatic discharge associated with the third junction.

In one or more embodiments, the first and second electrostatic discharge components may comprise human body model (HBM) diodes.

In one or more embodiments, the receiver frontend may also include a third electrostatic discharge component coupled to the second junction, wherein the third electrostatic discharge component is configured to provide a third low impedance path to ground for an electrostatic discharge associated with the second junction, and a fourth electrostatic discharge component coupled to the fourth junction, wherein the fourth electrostatic discharge component is configured to provide a fourth low impedance path to ground for an electrostatic discharge associated with the fourth junction.

In one or more embodiments, the receiver frontend may also include a first additional capacitor coupled between the first node and a first common node.

In one or more embodiments, the receiver frontend may also include a second additional capacitor coupled between the second node and the first common node.

In one or more embodiments, the equalizer may further include a fifth resistor coupled between the first junction and a fifth junction, a sixth resistor coupled between the third junction and a sixth junction, a seventh resistor coupled between the first node and the fifth junction, and an eighth resistor coupled between the first node and the sixth junction. The equalizer is configured to provide a first additional output signal at the fifth junction, and a second additional output signal at the sixth junction. The first voltage source is configured to adjust a common-mode voltage associated with the first additional output signal and the second additional output signal.

In one or more embodiments, a combination of the first resistor, the third resistor, the fifth resistor, the seventh resistor, and a first termination resistor, may have a resistance value equal to R, the first termination resistor coupled between the first junction and a second node; a combination of the second resistor, fourth resistor, sixth resistor, and eighth resistor may have a resistance value equal to R; a combination of the first resistor, the third resistor, the fifth resistor, and the seventh resistor, may have a resistance value greater than R; and a combination of the second resistor, the fourth resistor, the sixth resistor, and the eighth resistor may have a resistance value greater than R.

In one or more embodiments, the receiver frontend may further include a boost control structure. The boost control structure may include a first boost control circuit comprising a first array of cells, the first boost control circuit configured to receive a first control signal that determines an on/off arrangement of the first array of cells, and wherein the first boost control circuit is configured to receive the first output signal from the second junction and the second output signal from the fourth junction, and generate a first boost control output signal at a seventh junction and a second boost control output signal at an eighth junction. In some embodiments, the boost control structure may also include a second boost control circuit comprising a second array of cells, the second boost control circuit configured to receive a second control signal that determines an on/off arrangement of the second array of cells, and wherein the second boost control circuit is configured to receive the first additional output signal from the fifth junction and the second additional output signal from the sixth junction, and generate a third boost control output signal at the seventh junction and a fourth boost control output signal at the eighth junction. In some embodiments, the boost control structure may also include a first boost control resistor coupled between the seventh junction and a boost control common node, and a second boost control resistor coupled between the eighth junction and the boost control common node.

In other embodiments, a receiver frontend includes a first input junction for receiving a first input signal, a second input junction for receiving a second input signal, a first output junction, a second output junction, and circuitry. The circuitry is configured to perform equalization on the first input signal and the second input signal to establish a first output signal with a desired frequency response at the first output junction, and to establish a second output signal with a desired frequency response at the second output junction, and perform common-mode voltage adjustment on a common-mode voltage associated with the first output signal and the second output signal.

In one or more embodiments, the circuitry may be further configured to perform common-mode voltage adjustment on a common-mode voltage associated with the first input signal and the second input signal.

In one or more embodiments, the circuitry may be further configured to perform termination of reflected signals associated with the first input signal and the second input signal.

In one or more embodiments, the circuitry may be further configured to provide electrostatic discharge (ESD) protection.

In one or more embodiments, the circuitry may be configured to perform the equalization on the first input signal by establishing a first additional output signal with a desired frequency response at a third output junction, and the circuitry may be configured to perform the equalization on the second input signal by establishing a second additional output signal with a desired frequency response at a fourth output junction.

In other embodiments, a signal processing method that involves a receiver frontend includes performing equalization on a first input signal associated with an input channel and a second input signal associated with the input channel. The first input signal is received at a first input junction of the receiver frontend and the second input signal is received at a second input junction of the receiver frontend. The equalization is performed so that a first output signal with a desired frequency response is established at a first output junction, and a second output signal with a desired frequency response is established at a second output junction. The method also includes performing common-mode input voltage adjustment for a common-mode input voltage associated with the first input signal and the second input signal to establish a desired common-mode output voltage for the first output signal and the second output signal.

In one or more embodiments, the method may further include performing termination of reflected signals associated with the first input signal and the second input signal, and providing electrostatic discharge protection to the receiver frontend.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 2-1 illustrates a circuit diagram of a serializer/deserializer receiver frontend according to some embodiments.

FIG. 2-2 illustrates a circuit diagram of a serializer/deserializer receiver frontend with added ESD protection according to some embodiments.

FIG. 4-1 illustrates a block diagram of the serializer/deserializer receiver frontend of FIG. 2-1 further connected to an additional signal processing component according to some embodiments.

FIG. 4-2 illustrates a block diagram of the serializer/deserializer receiver frontend of FIG. 3 further connected to an additional signal processing component according to some embodiments.

FIG. 6-1 illustrates a first unit cell of the boost control structure of FIG. 5 according to some embodiments.

FIG. 6-2 illustrates a second unit cell of the boost control structure of FIG. 5 according to some embodiments.

DETAILED DESCRIPTION

Figure 1:
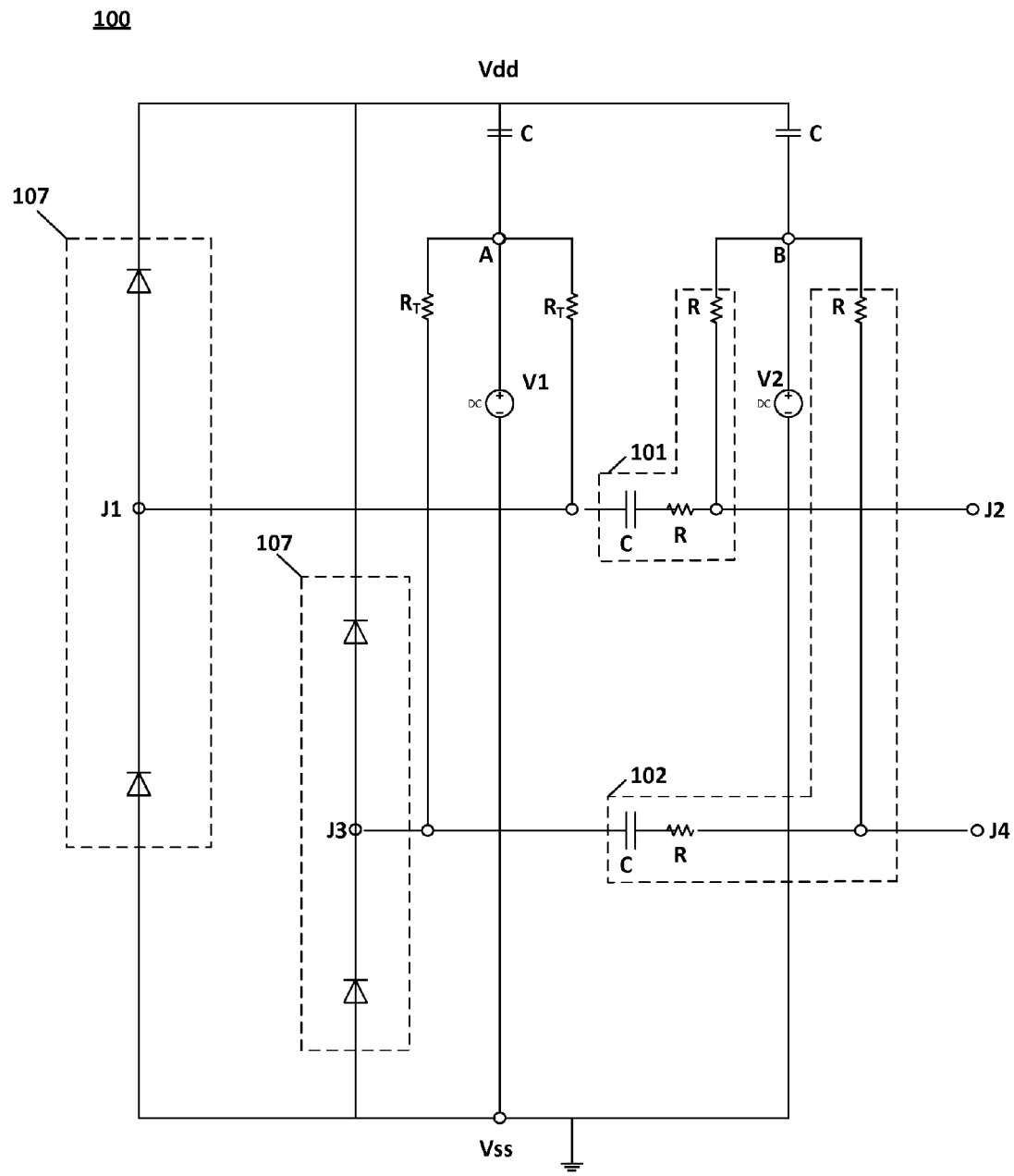
FIG. 1 illustrates a circuit diagram of a serializer/deserializer receiver frontend using AC-coupled capacitance.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

FIG. 1 illustrates a serializer/deserializer receiver frontend 100 which utilizes on-chip AC-coupled capacitance to perform independent common-mode adjustment for both input signals and output signals. As used in this specification, the term "receiver frontend" refers to any component(s) of a serializer/deserializer that performs initial signal processing on input signals, wherein the initial signal processing may or may not be the very first processing of the input signals, and may refer to any part(s) of a signal processing process that occurs before the very last part of the signal processing process. The receiver frontend 100 is configured to receive a first input signal and a second input signal at a first input junction J1 and a second input junction J3 respectively. The first input signal and second input signal may each be one of a pair of differential signals of the input channel. A first component 101 and second component 102 of the receiver frontend 100 may utilize AC-coupled capacitance to separate a common-mode associated with the first input signal and the second input signal from the receiver frontend 100, because the common-mode associated with the input signals may not be optimal for additional processing.

The receiver frontend 100 is also configured to perform common mode voltage adjustment of a common mode associated with the first and second output signal. A voltage source V2 may be supplied to both the first output signal and the second output signal. The capacitor of the first component 101 and the capacitor of the second component 102 may decouple the common-mode voltage of the input signals from the rest of the receiver frontend 100. Common mode voltage adjustment of the common mode voltage associated with the output signals may then be provided by adjusting the voltage supplied by the voltage source V2. By adjusting the voltage supplied by the voltage source V2, a desired common-mode voltage associated with the first and second output signals may be achieved.

The receiver frontend 100 may also be configured to perform common-mode voltage adjustment of a common-mode associated with the first and second input signal. A voltage source V1 may be supplied to both the first output signal and the second output signal. Common-mode voltage adjustment may be provided by adjusting the voltage supplied by the voltage source V1. By adjusting the voltage supplied by the voltage source V1, a desired common-mode voltage associated with the first input signal and the second input signal may be achieved.

Additionally, the receiver frontend 100 may be configured to provide termination of the input channel. In some cases, an input channel may experience reflection when received by the receiver frontend 100 due to the mismatch in impedance between silicon chip inputs (e.g., pads) and the receiver frontend 100. Termination resistors $R_T$ connected to the first and second input junctions provide for termination of the respective input signals. The termination resistors $R_T$ eliminate the unwanted reflected signals to prevent unwanted distortion of waveforms associated with the respective input signals.

Furthermore, the receiver frontend 100 may be configured to provide ESD protection. ESD components 107 connected to the first and second input junctions provide protection to the receiver frontend 100 against electrostatic discharge. Each ESD component 107 may be a pair of human body model (HBM) diodes. The ESD components provide a low impedance path to ground for sudden and momentary bursts of electric current to protect the receiver frontend 100 from permanent damage.

While the above serializer/deserializer receiver frontend 100 provides some desirable functions, it also exhibits numerous undesirable characteristics. The time constant for the first component 101 of the receiver frontend 100 and the time constant for the second component 102 of the receiver frontend 100 are both too short to pass low frequency contents of the respective signals in this particular configuration due to the AC-coupled capacitances of the receiver frontend 100. The short time constant creates a high-pass filter that each differential input signal must pass through before output signals may be established for the receiver frontend 100. For low frequency contents of input signals, significant attenuation of the corresponding output signals occurs due to the short time constant defined by the first component 101 of the receiver frontend 100 and also the second component 102 of the receiver frontend 100. This is especially problematic for unencoded signals, where very large sequences of zeros or ones can be transmitted within each signal.

Often times the ESD protection provided by the ESD components 107 at the first and second input junctions is insufficient. This is especially true when the receiver frontend 100 is further connected to an additional signal processing component.

In some situation, the receiver frontend 100 may also include additional ESD components connected to the first and second output junctions to provide additional ESD protection for when output signals are transmitted to additional components. Each ESD component may be a pair charge device model (CDM) diodes. An important constraint of an ESD protection network is the requirement of an isolation impedance being introduced between the two pairs of ESD components. Here, the isolation impedance takes the form of isolation resistors $R_I$ connected to the first and second output junctions.

Figures 1, 2:
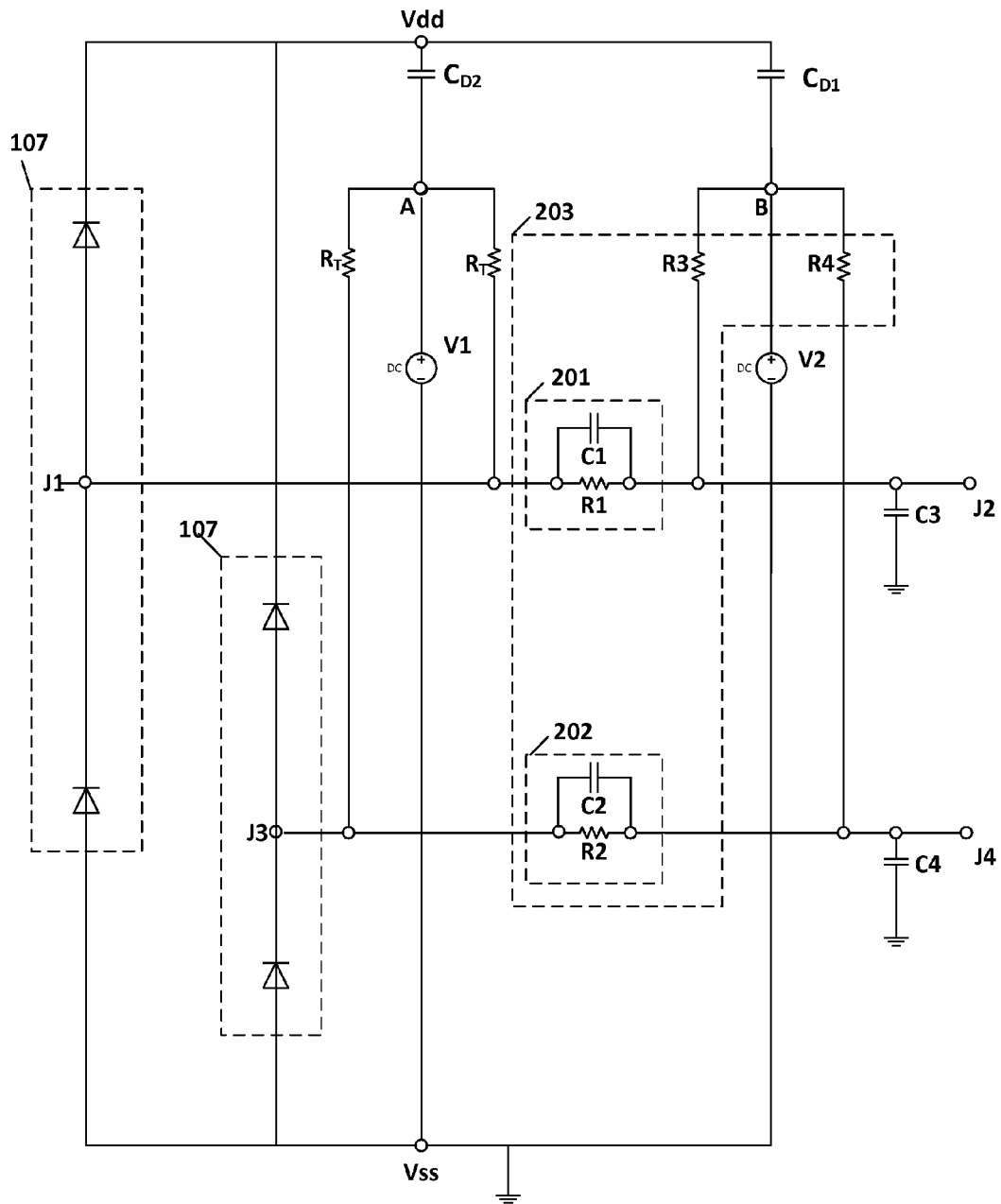
Figure 2:
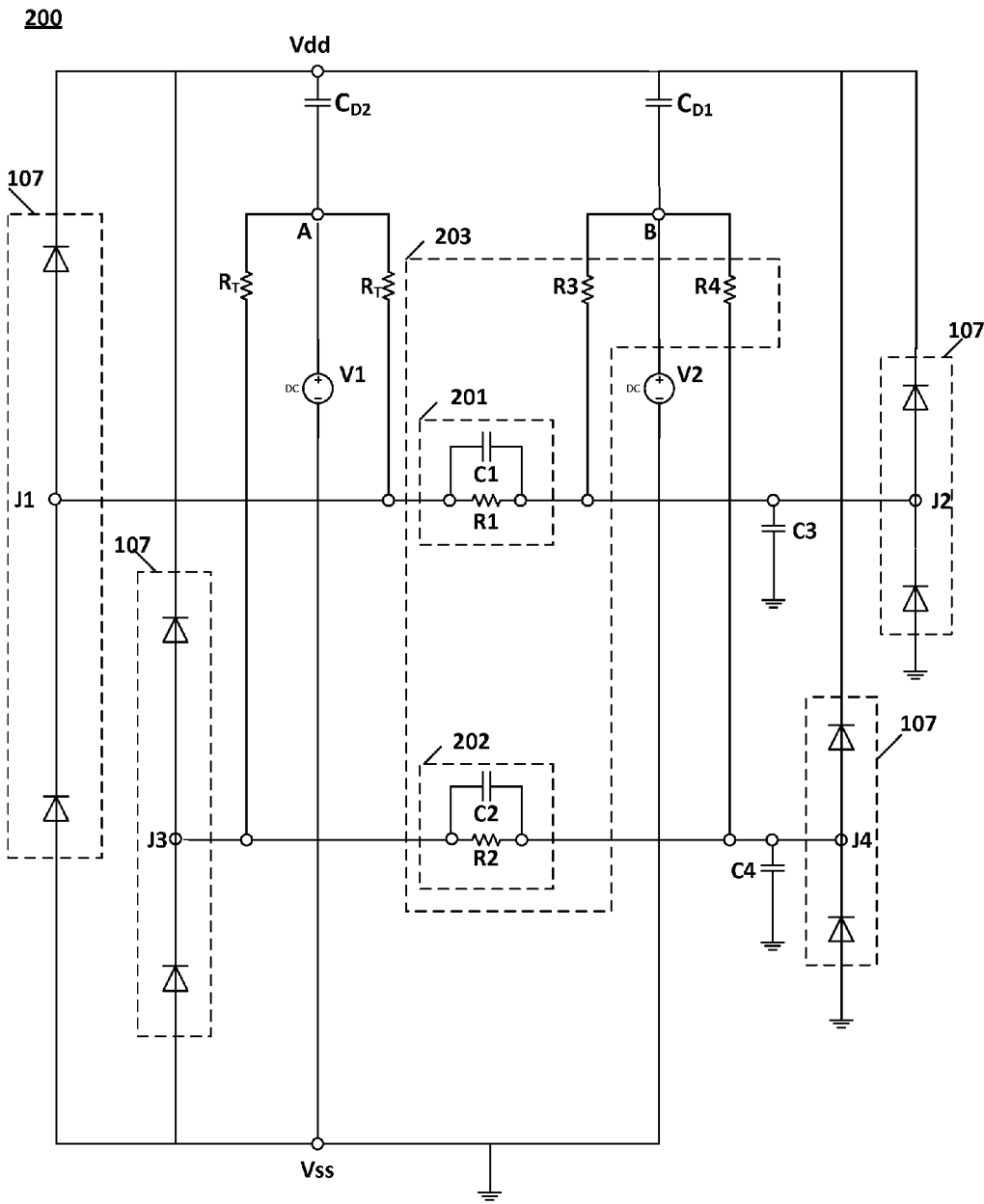

FIG. 2-1 illustrates a serializer/deserializer receiver frontend 200 according to some embodiments. The serializer/deserializer receiver frontend 200 in FIG. 2-1 utilizes a passive equalizer to perform signal processing of an input channel, including equalization of the pair of differential input signals associated with the input channel and additionally common-mode voltage adjustment for a wide range of common-mode input voltages. In some embodiments, the receiver frontend 200 may additionally provide ESD protection and on chip signal termination.

The receiver frontend 200 comprises an equalizer 203 that includes a first component 201 located between a first junction J1 and a second junction J2, as well as a second component 202 located between a third junction J3 and a fourth junction J4. The first junction J1 and the third junction J3 are configured to receive a first input signal and a second input signal respectively. The first input signal and second input signal may each be one of a pair of differential signals of the input channel. The first component 201 may include a first capacitor C1 in parallel with a first resistor R1. The second component 202 may include a second capacitor C2 in parallel with a second resistor R2.

As used in this specification, the term "junction" may refer to any part of a conductor, and therefore, is not necessarily limited to an intersection point between two conductors. For example, in some embodiments, junction J1 may refer to any part of the conductor that extends from the intersection of the two conductors (where the label "J1" is located). Also, as used in this specification, the terms "first", "second", "third", "fourth", . . . etc. (as in "first junction", "second junction", third junction", fourth junction", . . . etc.) are used to distinguish one item (e.g., junction) from another, and does not necessarily refer to the order of items. In addition, depending on the context, any of the phrases "first junction", "second junction", . . . etc., or similar terms, may refer to any of the junctions J1, J2, J3, J4, . . . etc. For example, in some embodiments, J1, J3 may be referred as "first junction" (or "first input junction") and "second junction" (or "second input junction"), respectively.

The equalizer 203 further comprises a third resistor R3 connected between a node B and the second junction J2, as well as a fourth resistor R4 connected between node B and the fourth junction J4. A voltage source V2 at node B is supplied to the second junction J2 through the third resistor R3 and is also supplied to the fourth junction J4 through the fourth resistor R4. The voltage source V2 may provide a voltage between 0 and a supply voltage (Vdd) in some embodiments. In other embodiments, the voltage may have different values or range of values. A first decoupling capacitor $C_{D1}$ may be connected between node B and a first common node Vdd. The first common node may be tied to any supply voltage in some embodiments. In the illustrated embodiments, the receiver frontend 200 also includes a second common node Vss. While FIG. 2-1 illustrates the second common node Vss as the ground, in some embodiments the second common node may be tied to a potential different than ground.

In some embodiments, the combination/both of the first resistor R1 and third resistor R3, may have a resistance value greater than a prescribed resistance value R, such as 50 ohms (Ω). For example, the first resistor R1 may have a resistance value of 400Ω and the third resistor R3 may have a resistance value of 200Ω. In some embodiments, the combination of the second resistor R2 and fourth resistor R4 may have a resistance value greater than the prescribed value R (e.g., 50Ω). For example, the second resistor R2 may have a resistance value of 400Ω and the fourth resistor R4 may have a resistance value of 200Ω. In some embodiments, the first resistor R1 and second resistor R2 may have the same value and the third resistor R3 and fourth resistor R4 may also have the same value. In other embodiments, the resistors R1-R4 may have respective resistance values that are different from the examples described.

Parasitic capacitances C3, C4 may form between the second junction J2 and the common node Vss (e.g., ground), and additionally between the fourth junction J4 and the common node Vss (e.g., ground), respectively. In some embodiments, the first capacitor C1 may have a capacitance value that is greater than the parasitic capacitance C3, and the second capacitor C2 may have a capacitance value that is greater than the parasitic capacitance C4. For example, the first capacitor C1 may have a capacitance value of 200 fF for a parasitic capacitance C3 of 20 fF, and the second capacitor C2 may have a capacitance value of 200 fF for a parasitic capacitance C4 of 20 fF. In other embodiments, the first and second capacitors C1, C2 may have other capacitance values.

As shown in the illustrated embodiments, another voltage source V1 may be connected to node A. The voltage source V1 may provide a voltage to the first junction J1 and the third junction J3, respectively. The voltage source V1 may provide a voltage between 0V and a supply voltage (Vdd). A second decoupling capacitor $C_{D2}$ may be connected between node A and the first common node Vdd.

In some embodiments, a pair of termination resistors $R_T$ may be established between node A and the first junction J1 as well as between node A and the third junction J3. In some embodiments, the combination of the termination resistor $R_T$, first resistor R1, and third resistor R3 may have a total resistance equal to the prescribed value R, such as 50Ω (e.g., 50Ω±1Ω). For example, the termination resistor $R_T$ may have a value of 54Ω, the first resistor R1 may have a value of 400Ω, and the third resistor R3 may have a value of 200Ω. In some embodiments, the combination of the termination resistor $R_T$, second resistor R2, and fourth resistor R4 have a total resistance value equal to R, such as 50Ω(e.g., 50Ω±1Ω). For example, the termination resistor $R_T$ may have a value of 54Ω, the first resistor R1 may have a value of 400Ω, and the third resistor R3 may have a value of 200Ω. Although the value 50Ω is used as the value R in the above embodiments, in other embodiments, the value R may be different from 50Ω. In some embodiments, the value of R may be chosen to be equal to the impedance of the channel.

In some embodiments, an ESD component 107 may be connected to the first junction J1, and an additional ESD component 107 may be connected to the second junction J2. Also, in some embodiments, the ESD component may be a pair of human body model (HBM) diodes. In some other embodiments, the ESD component may be a different ESD protection element.

The receiver frontend 200, and specifically the equalizer 203, is configured to perform equalization on an input channel (e.g., equalization on signals associated with the channel). The first component 201 of the equalizer 203 in combination with the third resistor R3 provides equalization to the first input signal (e.g., one of the pair of differential signals). The second component 202 of the equalizer 203 in combination with the fourth resistor R4 provides equalization to the second input signal (e.g., one of the pair of differential signals). During equalization, high frequency contents of the input signals may be boosted in order to compensate for losses in the channel. A first output signal corresponding to the first input signal is generated at the second junction J2 by the equalizer 203. A second output signal corresponding to the second input signal is generated at the fourth junction J4 by the equalizer 203. At low frequencies, the first resistor R1 and third resistor R3 form a voltage divider for the first input signal. Likewise, at low frequencies, the second resistor R2 and fourth resistor R4 form a voltage divider for the second input signal. Unlike the frontend of FIG. 1, low frequency contents of the signals are DC-coupled in this case. This allows the receiver frontend 200 in FIG. 2-1 to be used for all input signals, including unencoded signals.

The receiver frontend 200 is also configured to perform common-mode voltage adjustment for the output signals. Common-mode voltage adjustment may be provided by adjusting the voltage supplied by the voltage source V2. By adjusting the voltage supplied by the voltage source V2, a desired common-mode voltage associated with the first output signal and the second output signal may be achieved. For example, a common-mode output voltage greater than 0.7 V may be desired when the receiver frontend 200 is configured to transmit output signals to additional signal processing components. In other embodiments, a common-mode output voltage or 0.7V or less may be desired. Regardless of the common-mode voltage associated with the input signals, the voltage source V2 may be used to drive the common-mode voltage associated with the output signals to a desired value.

In some embodiments, the receiver frontend 200 is also configured to provide common-mode voltage adjustment for the input signals. Common-mode voltage adjustment may be provided by adjusting the voltage supplied by the voltage source V1. By adjusting the voltage supplied by the voltage source V1, a desired common-mode voltage associated with the first input signal and the second input signal may be achieved.

In some embodiments, the receiver frontend 200 may be configured to provide termination of the input channel. As mentioned above, an input signal may experience reflection when received by a receiver frontend due to the mismatch in impedance between the input channel and the receiver frontend. The termination resistors $R_T$ in the receiver frontend 200 are advantageous because they provide for termination of the respective input signals. The termination resistors $R_T$ reduce/eliminate the unwanted reflected signals to prevent distortion of input channel waveform.

In some embodiments, the receiver frontend 200 may be configured to provide ESD protection. In particular, the ESD components 107 of the receiver frontend 200 provide protection to the receiver frontend 200 against electrostatic discharge. Each ESD component 107 provides a low impedance path to ground for electrostatic discharge to protect the receiver frontend 200 from permanent damage. As used in this specification, the term "low impedance path" refers to any exit path that allows for the receiver frontend to dissipate electrostatic discharge, and may or may not necessarily refer to any impedance path having any particular value.

The serializer/deserializer receiver frontend 200 in FIG. 2-1 provides several advantages over the serializer/deserializer receiver frontend 100 described above in FIG. 1. These advantages will be discussed in detail below.

In contrast to the receiver frontend 100 in FIG. 1, the receiver frontend 200 in FIG. 2-1 is configured to perform equalization of input signals. Any processing effects on input signals at the receiver frontend 100 of FIG. 1 are solely parasitic and not intended to result in equalization of the input signals. The time constant for the components 101 and 102 in the receiver front end 100 are designed to maximize passing of low frequency contents of the input signals. However, the receiver frontend 200 in FIG. 2-1 is configured to perform actual equalization on the input signals in addition to any other functionality performed by the receiver frontend 100 of FIG. 1.

Additionally, because the receiver frontend 200 is DC-coupled rather than AC-coupled, the receiver frontend 200 does not suffer from a zero at low frequency. As a result, low frequency components of an input signal do not suffer from significant attenuation of their corresponding output signals. As such, optimal equalization of differential input signals may be achieved. Thus, the receiver frontend 200 is able to support all signal processing standards including unencoded signals, where very large sequences of ones and zeros may be transmitted within each signal.

Furthermore, because of the passive nature of the receiver frontend 200, specifically the first component 201 and the second component 202, equalization of input differential signals does not suffer from non-linearity, added noise (as in SERDES application), power dissipation, or over-amplification. Moreover, the minimal number of components in such a receiver frontend configuration also allows for a far less complicated implementation. For example, the receiver frontend 200 of FIG. 2-1 may not require an addition of bias control circuits in some embodiments.

As already discussed above, often times the ESD protection provided by the ESD components 107 at the first junction J1 and the third junction J3 may be insufficient. This is especially true when the receiver frontend is further connected to an additional signal processing component. FIG. 2-2 illustrates a circuit diagram of a serializer/deserializer receiver frontend 200 with additional ESD protection in accordance with some further embodiment.

The receiver frontend 200 in FIG. 2-2 includes all the features already described above with respect to FIG. 2-1. However, the receiver frontend 200 in FIG. 2-2 also includes ESD components 107 connected to the second junction J2 and fourth junction J4 to provide additional ESD protection for when output signals are transmitted to the additional signal processing component. In some embodiments, these ESD components 107 may be charge device model (CDM) diodes. In order to ensure minimal undesirable behavior of the serializer/deserializer frontend caused by interaction between the ESD components 107 at the first junction J1 and second junction J2, as well as interaction between the ESD components 107 at the third junction J2 and fourth junction J4, an isolation impedance may be introduced between the two pairs of ESD components. In the illustrated embodiments, the ESD components coupled to the respective junctions J1-J4 provide respective low impedance paths for electrostatic discharges to the ground at the respective four junctions J1-J4.

While the receiver frontend 100 discussed above may require additional isolation resistors to achieve isolation when additional ESD components are introduced, the impedance formed by the first component 201 and second component 202 of the receiver frontend 200 in FIG. 2-2 is sufficiently high to provide isolation without having to introduce additional components to the receiver frontend 200. Not only does this save costs and reduce complexity in producing such a receiver frontend, it also improves ESD robustness of the receiver frontend.

Figure 3:
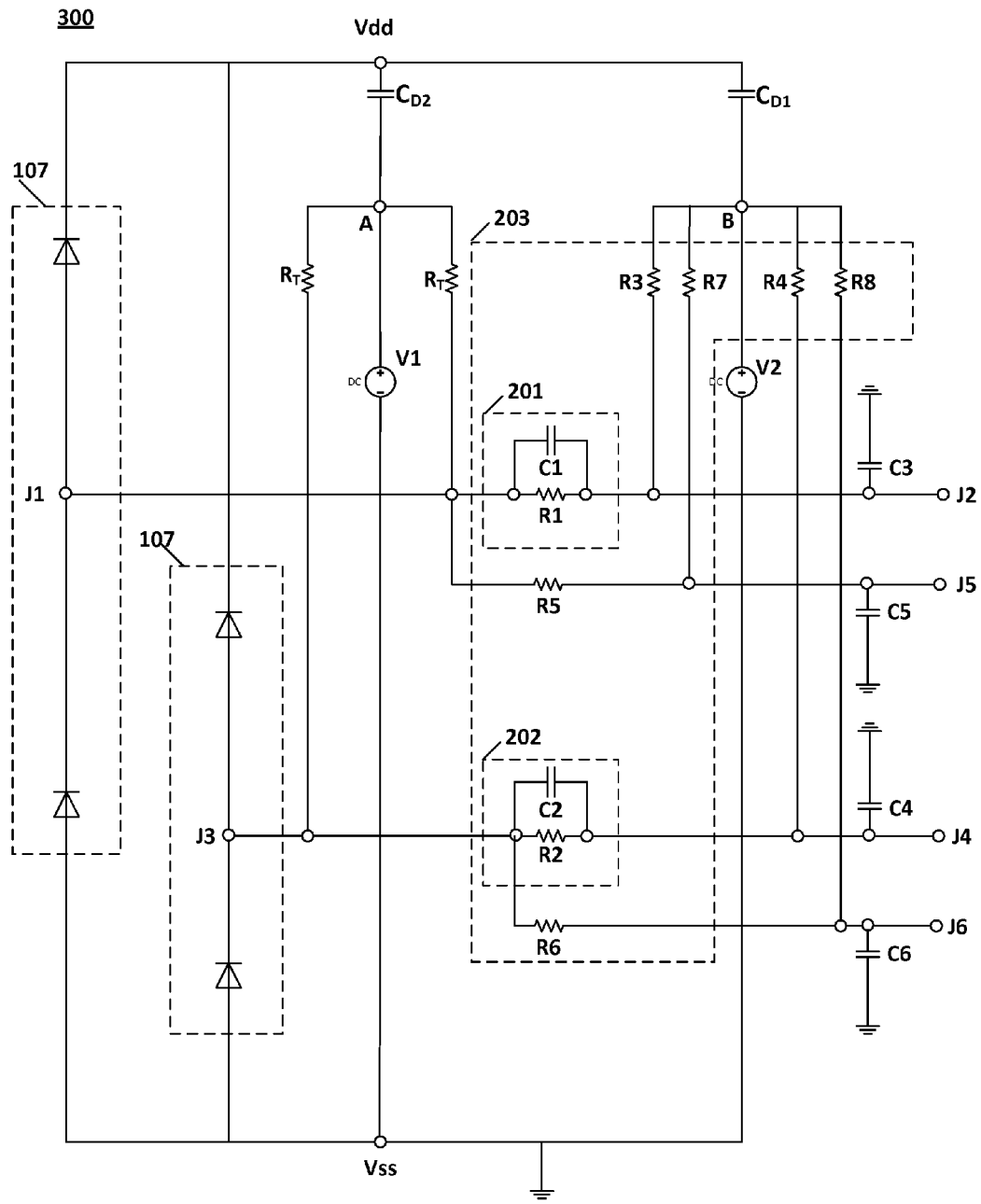
FIG. 3 illustrates a circuit diagram of a serializer/deserializer receiver frontend according to other embodiments.

FIG. 3 illustrates a serializer/deserializer receiver frontend 300 according to some further embodiments. In some embodiments, it may be desirable to provide multiple output paths for a single differential input signal. FIG. 3 illustrates a receiver frontend 300 that provides multiple output paths for a single differential input signal. The receiver frontend 300 in FIG. 3 includes all the features already described above with respect to FIG. 2-1. For purposes of discussion, features of the serializer/deserializer receiver frontend 300 in FIG. 3 that are new relative to the embodiments of FIG. 2-1 will be described.

In addition to the components already discussed above with respect to FIG. 2-1, the equalizer 203 of the serializer/deserializer receiver frontend 300 in FIG. 3 also includes a fifth resistor R5 between the first junction J1 and a fifth junction J5. The equalizer 203 of the receiver frontend 300 also includes a sixth resistor R6 between the third junction J3 and a sixth junction J6. Furthermore, a seventh resistor R7 is provided between node B and the fifth junction J5, and an eighth resistor R8 is provided between node B and the sixth junction J6. A first additional output signal corresponding to the first input signal is generated at the fifth junction J5 by the equalizer 203, and a second additional output signal corresponding to the second input signal is generated at the sixth junction J6 by the equalizer 203.

In some embodiments, the combination of the first resistor R1, third resistor R3, fifth resistor R5, and seventh resistor R7 may have a resistance value greater than a prescribed resistance value R, such as 50Ω. Said otherwise, the series combination of the first resistor R1 and third resistor R3 in parallel with the series combination of the fifth resistor R5 and seventh resistor R7 may have a resistance value greater than the prescribed resistance value R (e.g., 50Ω). For example, the first resistor R1 may have a resistance value of 800Ω, the third resistor R3 may have a resistance value of 400Ω, the fifth resistor R5 may have a resistance value of 800Ω and the seventh resistor R7 may have a resistance value of 400Ω. In some embodiments, the combination of the second resistor R2, fourth resistor R4, sixth resistor R6, and eighth resistor R8 may have a resistance value greater than the prescribed value R (e.g., 50Ω). Said otherwise, the series combination of the second resistor R2 and fourth resistor R4 in parallel with the series combination of the sixth resistor R6 and eighth resistor R8 may have a resistance value greater than the prescribed value R (e.g., 50Ω). For example, the second resistor R2 may have a resistance value of 800Ω, the fourth resistor R4 may have a resistance value of 400Ω, the sixth resistor R6 may have a resistance value of 800Ω, and the eighth resistor R8 may have a resistance value of 400Ω. In other embodiments, the resistors R1-R8 may have respective resistance values that are different from the examples described.

Additionally, the voltage source V2 may supply voltage to the fifth junction J5 through the seventh resistor R7 and may also supply voltage to the sixth junction J6 through the eighth resistor R8. Parasitic capacitances C5, C6 may also form between the fifth junction J5 and the second common node (e.g., ground) and additionally between the sixth junction J6 and the second common mode (e.g., ground), respectively. In some embodiments, the parasitic capacitances C5, C6 may each have a capacitance value of 20 fF. In other embodiments, the parasitic capacitances C5, C6 may have respective capacitance values that are different from 20 fF.

In some embodiments, the combination of the termination resistor $R_T$, first resistor R1, third resistor R3, fifth resistor R5, and seventh resistor R7 may have a total resistance equal to the prescribed value R, such as 50Ω (e.g., 50Ω±1Ω). For example, the termination resistor $R_T$ may have a value of 54Ω, the first resistor R1 may have a value of 800Ω, the third resistor R3 may have a value of 400Ω, the fifth resistor R5 may have a value of 800Ω, and the seventh resistor R7 may have a value of 400Ω. In some embodiments, the combination of the termination resistor $R_T$, second resistor R2, fourth resistor R4, sixth resistor R6, and eighth resistor R8 may have a total resistance equal to R, such as 50Ω (e.g., 50Ω±1Ω). For example, the termination resistor $R_T$ may have a value of 54Ω, the second resistor R2 may have a value of 800Ω, the fourth resistor R4 may have a value of 400Ω, the sixth resistor R6 may have a value of 800Ω, and the eighth resistor R8 may have a value of 400Ω. In other embodiments, the resistors $R_T$ and R1-R8 may have resistance values that are different from the examples described. Also, although the value 50Ω is used as the value R in the above embodiments, in other embodiments, the value R may be different from 50Ω.

The receiver frontend 300 of FIG. 3 provides an additional output path between the first junction J1 and the fifth junction J5 for the differential input signal received at the first junction J1 to pass through. The receiver frontend 300 of FIG. 3 also provides an additional output path between the third junction J3 and the sixth junction J6 for the differential input signal received at the third junction J3 to pass through. These additional output paths are configured to provide a flat AC response, and may be used by the differential input signals to bypass the first component 201 and the second component 202 when the differential input signals are of low frequency. These additional output paths may also facilitate further processing of corresponding output signals.

The receiver frontend 300 is also configured to perform common-mode voltage adjustment for the additional output signals. Common-mode voltage adjustment may be provided by adjusting the voltage supplied by the voltage source V2. By adjusting the voltage supplied by the voltage source V2, a desired common-mode voltage associated with the first additional output signal and the second additional output signal may be achieved.

In some embodiments, the ratio of the first resistor R1 to the third resistor R3, the ratio of the fifth resistor R5 and the seventh resistor R7, the ratio of the second resistor R2 and the fourth resistor R4, and the ratio of the sixth resistor R6 and the eighth resistor R8 may be the same (e.g., within 5% in difference due to process/mismatch variation) in order to ensure that common mode voltage adjustment for corresponding output signals remains the same.

While FIG. 3 depicts a single additional output path for each differential input signal of an input channel, in some embodiments more than one additional output path may be provided for each differential input signal.

Figures 1, 4:
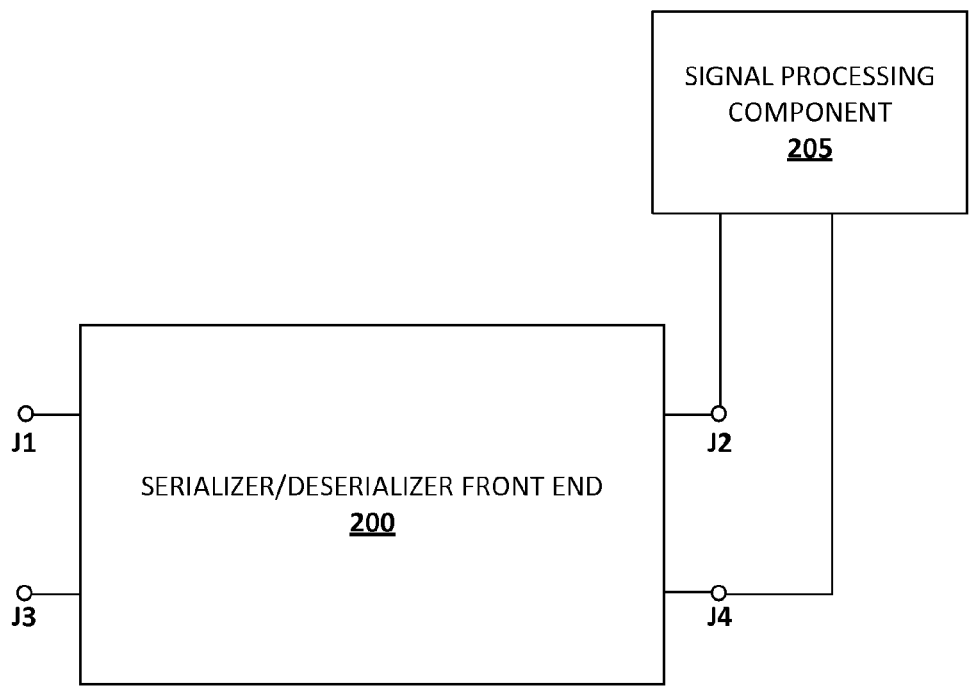
Figures 2, 4:
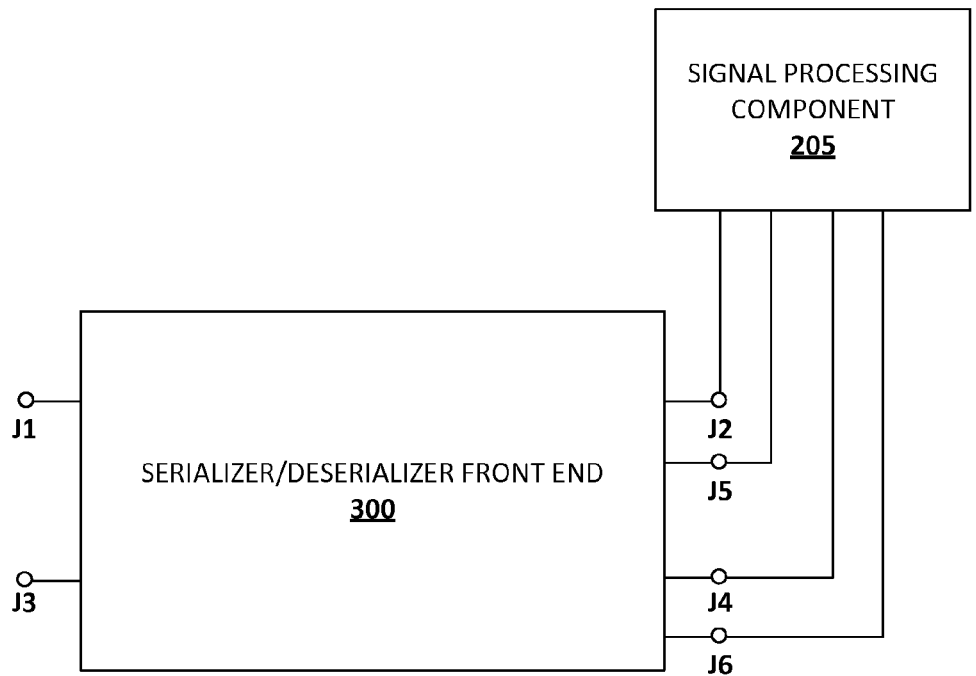

In some embodiments, the serializer/deserializer receiver frontend 200/300 may be further connected to one or more signal processing components configured to further process the output signals of the receiver frontend 200/300. FIG. 4-1 illustrates a block diagram of the receiver frontend 200 of FIG. 2-1 further connected to an additional signal processing component 205. The output signals at the second junction J2 and the fourth junction J4 are transmitted to the additional signal processing component 205, which is configured to receive the output signals. FIG. 4-2 illustrates a block diagram of the serializer/deserializer receiver frontend 300 in FIG. 3 further connected to an additional signal processing component 205. The output signals at the second junction J2, fourth junction J4, fifth junction J5, and sixth junction J6 are transmitted to the additional signal processing component 205, which is configured to receive the output signals.

Figure 5:
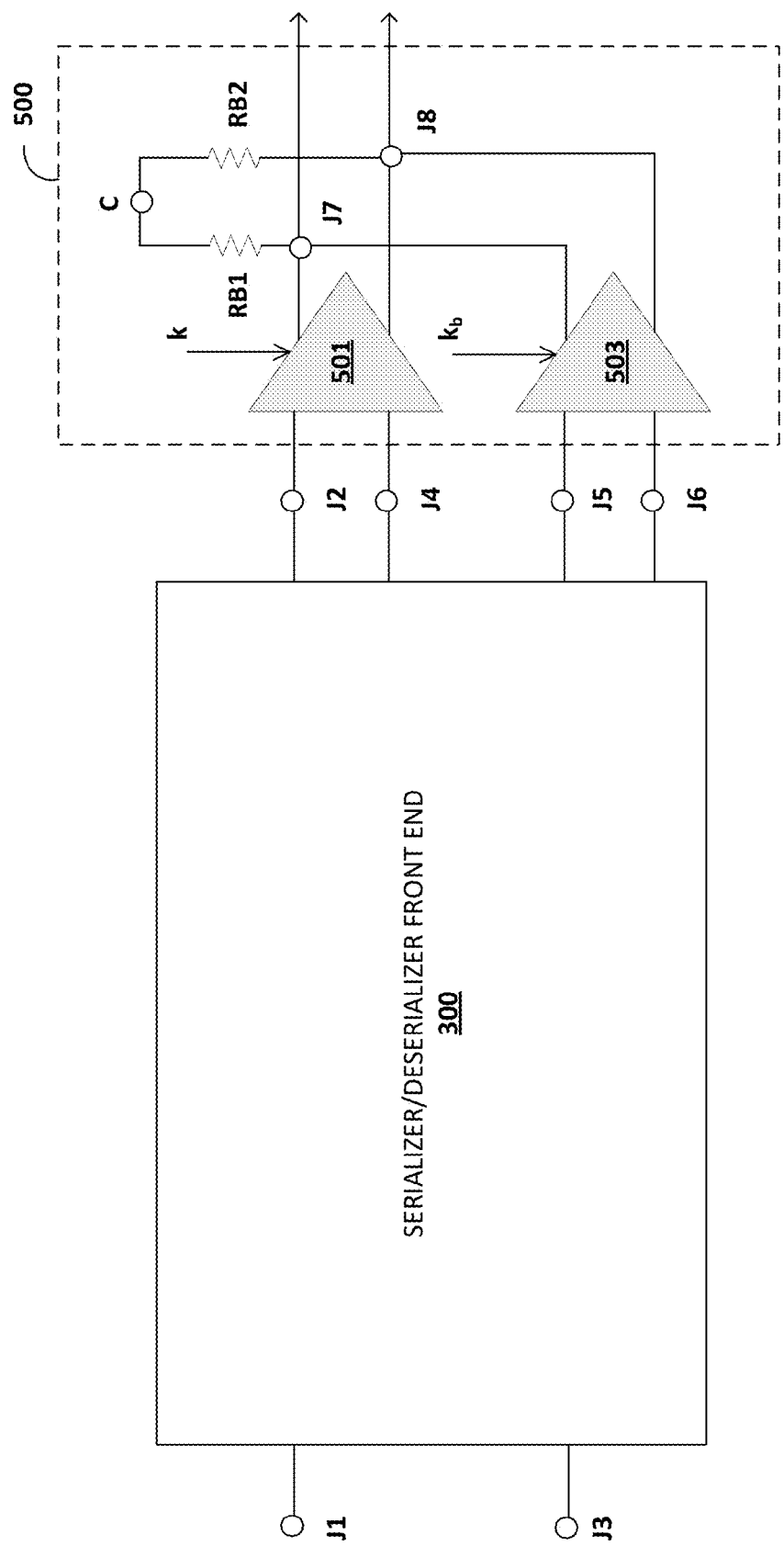
FIG. 5 illustrates the serializer/deserializer receiver front end of FIG. 3 with an additional boost control structure according to some embodiments.

In addition to the functionality provided by the receiver frontend 300 described above with respect to FIG. 3, in some embodiments, it may also be desirable for the receiver frontend 300 to further provide frequency dependent peak control. FIG. 5 illustrates the serializer/deserializer receiver frontend 300 of FIG. 3 further comprising a boost control structure 500 configured to receive output signals from the second junction J2, fourth junction J4, fifth junction J5, and sixth junction J6 of the receiver frontend 300, and provide frequency dependent peak control to those output signals. The boost control structure 500 illustrated in FIG. 5 utilizes digital control and is configured to maintain DC gain, output common mode, and pole location of received output signals while performing peak control in contrast to prior solutions.

The boost control structure 500 comprises a first boost control circuit 501 and a second boost control circuit 503. The output signals at the second junction J2 and the fourth junction J4 of the receiver frontend 300 may be coupled to the first boost control circuit 501, and the output signals at the fifth junction J5 and the sixth junction J6 may be coupled to the second boost control circuit 503. In some embodiments, the output signal at the second junction J2 may be an AC component output signal corresponding to the first input signal received by the receiver frontend 300, and the output signal at the fifth junction J5 may be a DC component output signal corresponding to the first input signal received by the receiver front end 300. Similarly, the output signal at the fourth junction J4 may be an AC component output signal corresponding to the second input signal received by the receiver frontend 300 and the output signal at the sixth junction J6 may be a DC component output signal corresponding to the second input signal received by the receive front end 300. In such embodiments, the first boost control circuit 501 is configured to provide peak control to AC component signals, and the second boost control circuit 503 is configured to provide peak control to DC component signals.

The boost control structure 500 is configured to generate a first boost control output signal at a seventh junction J7 corresponding to the output signal received from the second junction J2, and to generate a second boost control output signal at an eighth junction J8 corresponding to the output signal received from the fourth junction J4. Likewise, the boost control structure 500 is configured to generate a third boost control output signal at the seventh junction J7 corresponding to the output signal received from the fifth junction J5, and to generate a fourth boost control output signal at the eighth junction J8 corresponding to the output signal received from the sixth junction J6. In some embodiments, the first boost control circuit 501 may be configured to generate the first and second boost control output signals while the second boost control circuit 503 may be configured to generate the third and fourth boost control output signals.

Each boost control circuit 501, 503 may comprise an array of cells and be driven by a control signal. The first boost control circuit 501 may be driven by a control signal k and the second boost control circuit 503 may be driven by another control signal $k_b$. In some embodiments, the control signal k may be a binary code and the control signal $k_b$ may be an inverse of binary code k. For example, binary code $k_b$ may equal $2^N-1-k$. The control signal k is provided to each cell of the first boost control circuit 501. The control signal k may be used to determine an on/off arrangement of the array of cells for the first boost control circuit 501. Similarly, control signal $k_b$ may be provided to each cell of the second boost control circuit 503. The control signal $k_b$ may be used to determine an on/off arrangement of the array of cells for the second boost control circuit 503.

Figures 1, 6:
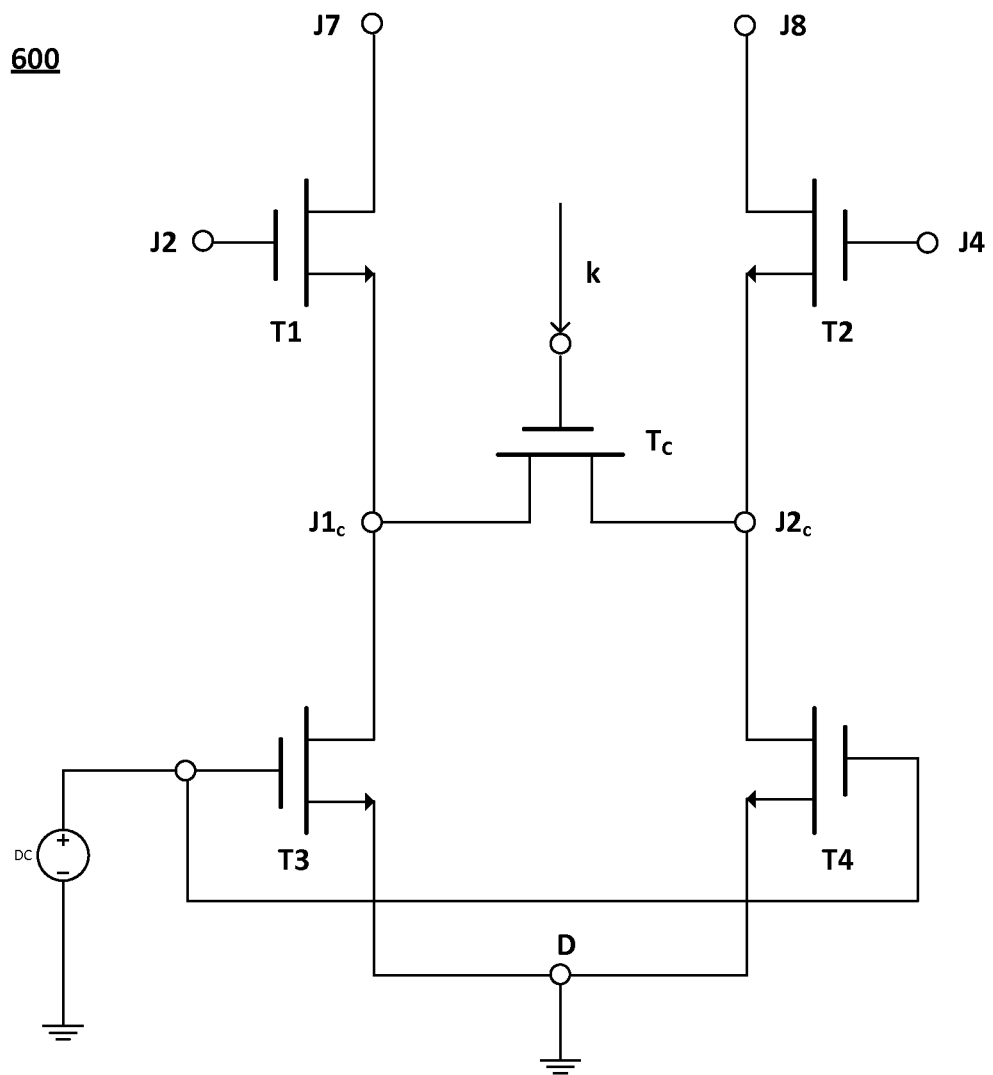
Figures 2, 6:
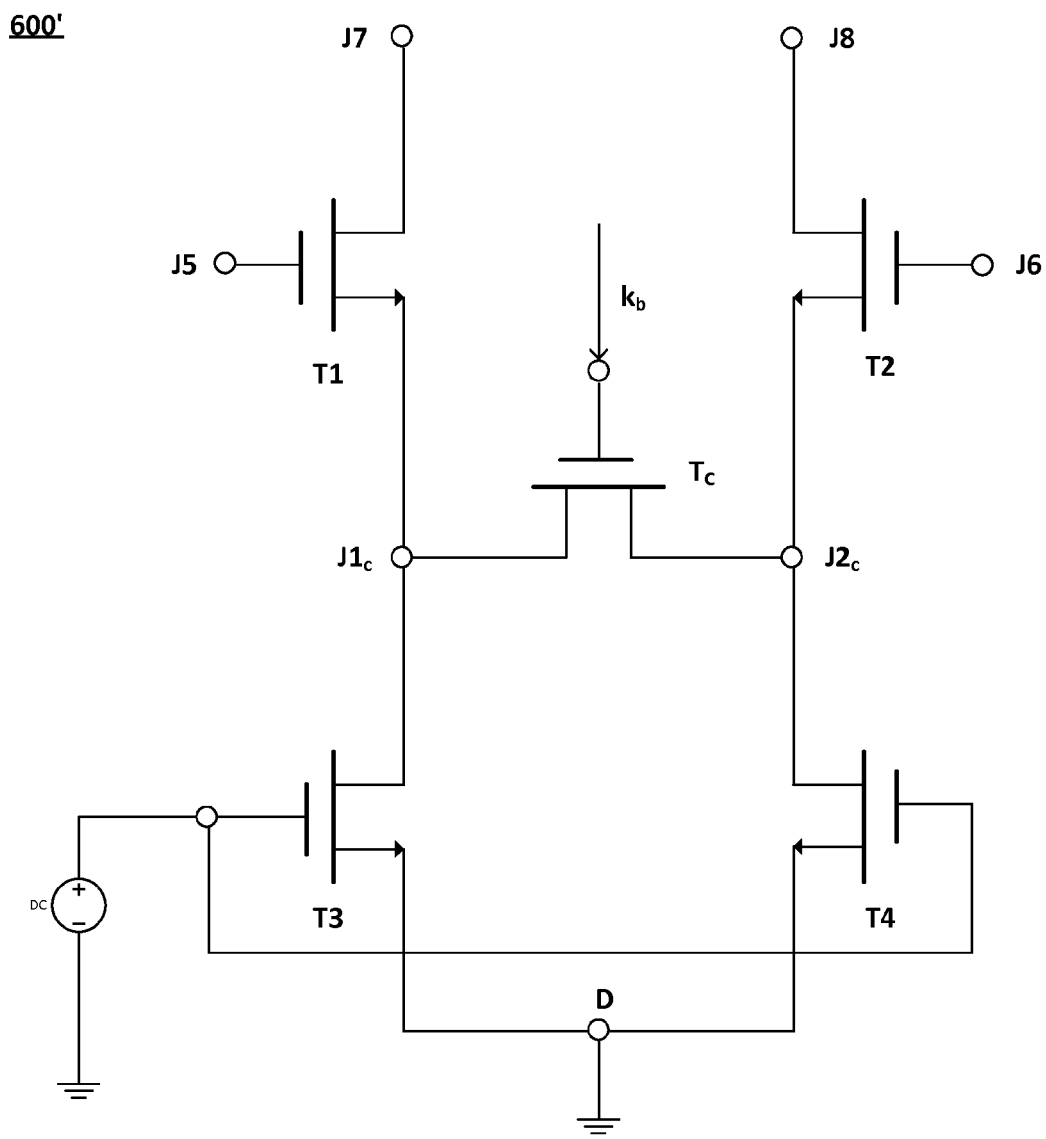

In some embodiments, each array of cells may be an array of unit cells. FIG. 6-1 illustrates an example of a unit cell 600 in the first boost control circuit 501 in accordance with some embodiments. Also, FIG. 6-2 illustrates an example of a unit cell 600' in the second boost control circuit 503 in accordance with some embodiments. In such embodiments, each unit cell 600 of the first boost control circuit 501 and each unit cell 600' of the second boost control circuit 503 are essentially the same, except that the unit cells 600 of the first boost control circuit 501 are configured to receive output signals from the second junction J2 and the fourth junction J4 of the receiver frontend 300, while the unit cells 600' of the second boost control circuit 503 are configured to receive output signals from the fifth junction J5 and the sixth junction J6 of the receiver frontend 300.

Unit cell 600 of the first boost control circuit 501 may include a first transistor T1, a second transistor T2, a third transistor T3, a fourth transistor T4, and a control transistor $T_c$. The first transistor T1 may be configured such that a gate of the first transistor T1 is coupled to the output signal at the second junction J2 of the receiver frontend 300, a source of the first transistor T1 is coupled to the seventh junction J7, and a drain of the first transistor T1 is coupled to a first cell junction $J1_c$. The second transistor T2 may be configured such that a gate of the second transistor T2 is coupled to the output signal at the fourth junction J4 of the receiver front end, a source of the second transistor T2 is coupled to the eighth junction J8, and a drain of the second transistor T2 is coupled to a second cell junction $J2_c$. The third transistor T3 may be configured such that a gate of the third transistor T3 is coupled to a cell voltage source $V_c$, a source of the third transistor T3 is coupled to the first cell junction $J1_c$, and a drain of the third transistor T3 may be coupled to a cell node D. The fourth transistor T4 may be configured such that a gate of the fourth transistor T4 may also be coupled to the cell voltage source $V_c$, a source of the fourth transistor T4 may be coupled to the second cell junction $J2_c$, and a drain of the fourth transistor T4 may be coupled to the cell node D. In some embodiments, the cell node D may be tied to ground. In other embodiments, the cell node D may be tied to a potential other than ground. The control transistor $T_c$ may be configured such that a gate of the control transistor $T_c$ may be coupled to a control signal k, a source of the control transistor $T_c$ may be coupled to the first cell junction $J1_c$, and a drain of the control transistor $T_c$ may be coupled to the second cell junction $J2_c$. For each unit cell 600, the state of the control transistor $T_c$ (which is driven by the control signal k) determines whether that particular unit cell 600 is enabled or disabled.

Unit cell 600' of the second boost control circuit 503 may also include a first transistor T1, a second transistor T2, a third transistor T3, a fourth transistor T4, and a control transistor $T_c$. The first transistor T1 may be configured such that a gate of the first transistor T1 is coupled to the output signal at the fifth junction J5 of the receiver front end 300, a source of the first transistor T1 is coupled to the seventh junction J7, and a drain of the first transistor T1 is coupled to a first cell junction $J1_c$. The second transistor T2 may be configured such that a gate of the second transistor T2 is coupled to the output signal at the sixth junction J6, a source of the second transistor T2 is coupled to the eighth junction J8, and a drain of the second transistor T2 is coupled to a second cell junction $J2_c$. The third transistor T3 may be configured such that a gate of the third transistor T3 is coupled to a cell voltage source $V_c$, a source of the third transistor T3 is coupled to the first cell junction $J1_c$, and a drain of the third transistor T3 may be coupled to a cell node D. The fourth transistor T4 may be configured such that a gate of the fourth transistor T4 may also be coupled to the cell voltage source $V_c$, a source of the fourth transistor T4 may be coupled to the second cell junction $J2_c$, and a drain of the fourth transistor T4 may be coupled to the cell node D. In some embodiments, the cell node D may be tied to ground. In other embodiments, the cell node D may be tied to a potential other than ground. The control transistor $T_c$ may be configured such that a gate of the control transistor $T_c$ may be coupled to a control signal $k_b$, a source of the control transistor $T_c$ may be coupled to the first cell junction $J1_c$, and a drain of the control transistor $T_c$ may be coupled to the second cell junction $J2_c$. For each unit cell 600', the state of the control transistor $T_c$ (which is driven by the control signal $k_b$) determines whether that particular unit cell 600' is enabled or disabled.

The boost control structure 500 may additionally have a pair of boost control resistors $R_B1$, $R_B2$. Resistor $R_B1$ may be located between the seventh junction J7 and a boost control structure common node C. Resistor $R_B2$ may be located between the eighth junction J8 and the boost control common node C.

For each unit cell 600, a first cell output signal corresponding to the received output signal from the second junction J2 may be generated at the seventh junction J7 and a second cell output signal corresponding to the received output signal from the fourth junction J4 may be generated at the eighth junction J8. Similarly, for each unit cell 600', a first cell output signal corresponding to the received output signal from the fifth junction J5 may be generated at the seventh junction J7, and a second cell output signal corresponding to the received output signal from the sixth junction J6 may be generated at the eighth junction J8. The first cell output signals of the first boost control circuit may be combined to form a first boost control output signal, and the second cell output signals of the first boost control circuit may be combined to form a second boost control output signal. Similarly, the first cell output signals of the second boost control circuit may be combined to form a third output boost control signal and the second unit cell output signals of the second boost control circuit may be combined to form a fourth boost control output signal.

In some embodiments, by configuring the on/off arrangement of the array of unit cells 600 of the first boost control circuit 501, configuring the on/off arrangement of the array of unit cells 600' of the second boost control circuit 503, and adjusting the cell voltage source, the boost control structure 500 may provide between 6-7 dB (or other values) of peaking to the output signals received from the second junction J2, fourth junction J4, fifth junction J5, and sixth junction J6. Additionally, the boost control structure 500 may maintain the DC gain, output common mode, and pole location of the output signals received from the second junction J2, fourth junction J4, fifth junction J5, and sixth junction J6. This is in contrast to prior boost control solutions that are unable to maintain DC gain, output common mode, or pole location of received output signals.

Figure 7:
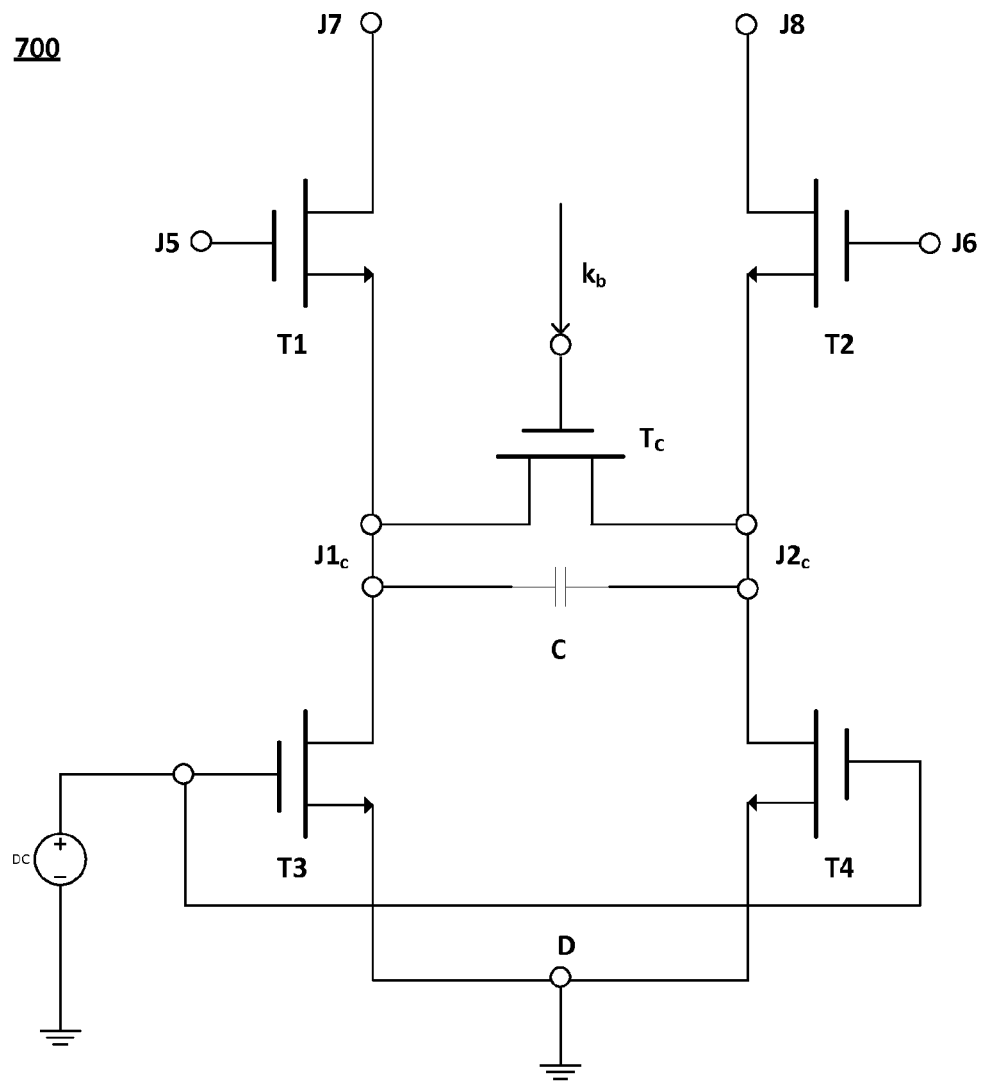
FIG. 7 illustrates a capacitance degeneration cell of the boost control structure of FIG. 5 according to some embodiments.

In some other embodiments, the second boost control circuit 503 may comprise an array of capacitance degeneration cells rather than an array of unit cells described above with respect to FIG. 6-2. An example of a capacitance degeneration cell 700 is illustrated in FIG. 7 in accordance with some embodiments. The capacitance degeneration cell 700 includes all the components of the unit cell 600' described above with respect to FIG. 6-2, with the addition of a capacitor C between the first cell junction $J1_c$ and the second cell junction $J2_c$.

As shown in FIG. 7, the capacitance degeneration cell may also generate a first cell output signal at the seventh junction J7 corresponding to the received output signal from the fifth junction J5 (for the second boost control circuit 503) and a second cell output signal at the eighth junction J8 corresponding to the received output signal from the sixth junction J6 (for the second boost control circuit 503). The first cell output signals of the second boost control circuit may be combined to form a third output boost control signal and the second cell output signals of the second boost control circuit may be combined to form a fourth boost control output signal.

Capacitance degeneration cells 700 are also configured to provide peak control at high frequencies even when the capacitance degeneration cell is disabled (e.g., control transistor is in an off state). By modifying an on/off arrangement of the array of capacitance degeneration cells of the second boost control circuit 503, the boost control structure 500 may provide an additional 1-2 dB of peaking to the output signals received from the second junction J2, fourth junction J4, fifth junction J5, and sixth junction J6 in comparison to a boost control structure with a second boost control circuit comprising an array of unit cells.

Figure 8:
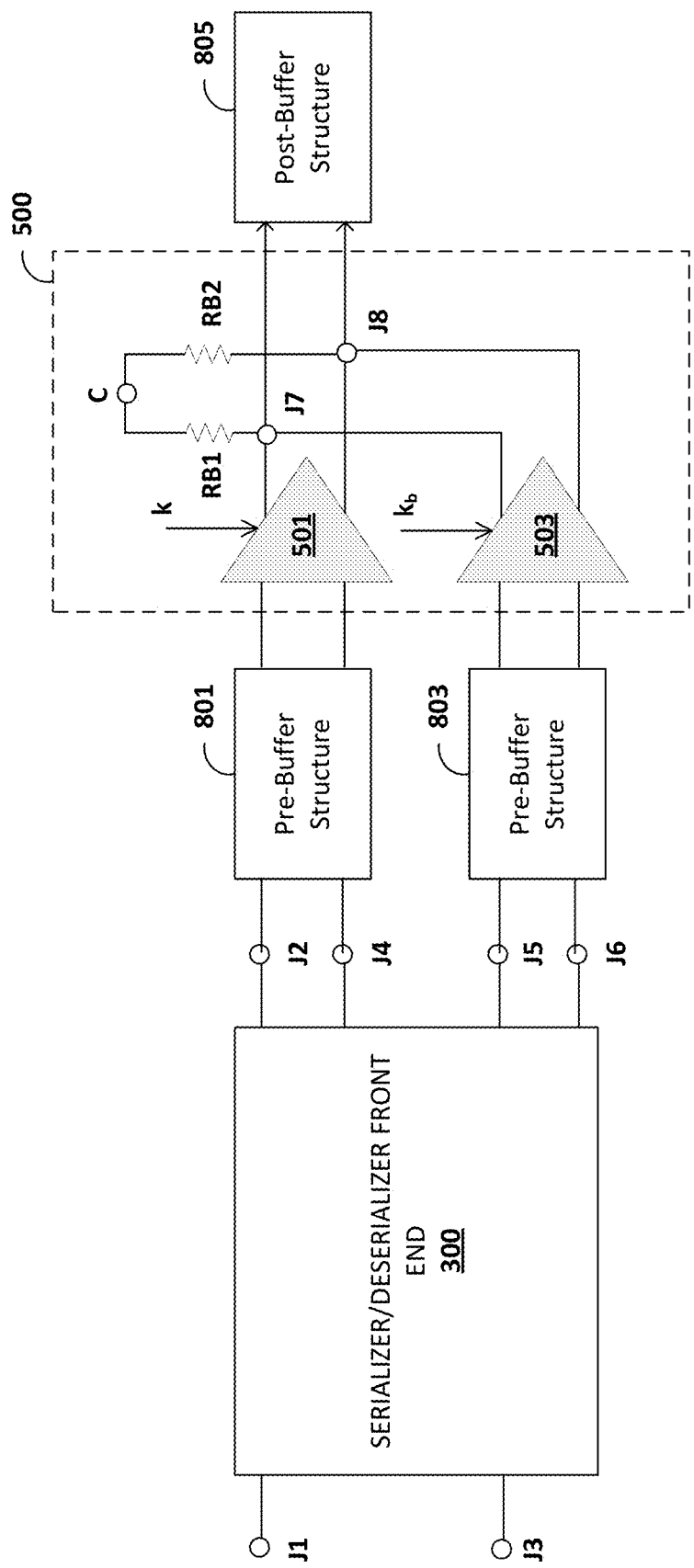
FIG. 8 illustrates the serializer/deserializer receiver frontend of FIG. 3 with an additional boost control structure, pre-buffer structures, and post-buffer structure according to some embodiments.

In some embodiments, peaking for output signals received from the second junction J2, fourth junction J4, fifth junction J5, and sixth junction J6 may be further improved by introducing a pair of pre-buffer structures and a post-buffer structure to the boost control structure. FIG. 8 illustrates the receiver front end with a boost control structure of FIG. 5, with the addition of a pair of pre-buffer structures 801, 803 and a post-buffer structure 805. The pre-buffer structures 801, 803 and post-buffer structure 805 may each comprise an array of capacitance degeneration cells 700 as described above with respect to FIG. 7. The first pre-buffer structure 801 may be configured to receive output signals from the second junction J2 and the fourth junction J4 and generate a corresponding first pre-buffer output signal and second pre-buffer output signal in the same way that boost control output signals are generated using the boost control circuits 501, 503 described above. The second pre-buffer structure 803 may be configured to receive output signals from the fifth junction J5 and the sixth junction J6 and generate a corresponding third pre-buffer output signal and fourth pre-buffer output signal in the same manner that boost control output signals are generated using the boost control circuits 501, 503 described above. The first pre-buffer output signals may be received by the first boost control circuit 501 of the boost control structure 500 and the second pre-buffer output signals may be received by the second boost control circuit 503 of the boost control structure 500. The first pre-buffer output signals and the second pre-buffer output signals may then undergo peak control by the boost control structure 500, as described above, to generate boost control output signals.

The boost control output signals may then be fed into a post-buffer structure 805, which generates corresponding post-buffer output signals. In some embodiments, by introducing a pair of pre-buffer structures 801, 803 and a post-buffer structure 805, a total of 12-15 dB of peaking may be provided to the output signals received from the second junction J2, fourth junction J4, fifth junction J5, and sixth junction J6.

Although particular embodiments have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover alternatives, modifications, and equivalents.

What is claimed is:
1. A receiver frontend, comprising:
an equalizer configured to perform equalization on an input channel comprising
a first component connected between a first junction and a second junction, the first component comprising a first capacitor in parallel with a first resistor, the first junction being configured to receive a first input signal associated with the input channel;
a second component connected between a third junction and a fourth junction, the second component comprising a second capacitor in parallel with a second resistor, the third junction being configured to receive a second input signal associated with the input channel;
a third resistor connected between a first node and the second junction; and a fourth resistor connected between the first node and the fourth junction;
wherein the equalizer is configured to provide a first output signal at the second junction, the first output signal corresponding to the first input signal, and to provide a second output signal at the fourth junction, the second output signal corresponding to the second input signal; and
a first voltage source coupled to the first node, wherein the first voltage source is configured to adjust a common-mode voltage associated with the first output signal and the second output signal.

2. The receiver frontend of claim 1, wherein a ratio between the first resistor and the third resistor, and a ratio between the second resistor and the fourth resistor are the same.

3. The receiver frontend of claim 1, further comprising:
a second voltage source coupled to a second node, wherein the second voltage source is configured to adjust a common-mode voltage associated with the first input signal and the second input signal.

4. The receiver frontend of claim 1, further comprising:
a first termination resistor coupled between the first junction and a second node, wherein the first termination resistor is configured to terminate reflected signals associated with the first input signal; and
a second termination resistor coupled between the third junction and the second node, wherein the second termination resistor is configured to terminate reflected signals associated with the second input signal.

5. The receiver frontend of claim 4, wherein:
a combination of the first resistor, the third resistor, and the first termination resistor, has a resistance value equal to R;
a combination of the second resistor, the fourth resistor, and the second termination resistor, has a resistance value equal to R;
a combination of the first resistor and third resistor has a resistance value greater than R; and
a combination of the second resistor and fourth resistor has a resistance value greater than R.

6. The receiver frontend of claim 1, further comprising:
a first electrostatic discharge component coupled to the first junction, wherein the first electrostatic discharge component is configured to provide a first low impedance path to ground for an electrostatic discharge associated with the first junction; and
a second electrostatic discharge component coupled to the second junction, wherein the second electrostatic discharge component is configured to provide a second low impedance path to ground for an electrostatic discharge associated with the third junction.

7. The receiver frontend of claim 6, wherein the first and second electrostatic discharge components comprise human body model (HBM) diodes.

8. The receiver frontend of claim 6, further comprising:
a third electrostatic discharge component coupled to the second junction, wherein the third electrostatic discharge component is configured to provide a third low impedance path to ground for an electrostatic discharge associated with the second junction; and
a fourth electrostatic discharge component coupled to the fourth junction, wherein the fourth electrostatic discharge component is configured to provide a fourth low impedance path to ground for an electrostatic discharge associated with the fourth junction.

9. The receiver frontend of claim 3, further comprising:
a first additional capacitor coupled between the first node and a first common node.

10. The receiver frontend of claim 9, further comprising:
a second additional capacitor coupled between the second node and the first common node.

11. The receiver frontend of claim 1, wherein the equalizer further comprises:
a fifth resistor coupled between the first junction and a fifth junction;
a sixth resistor coupled between the third junction and a sixth junction;
a seventh resistor coupled between the first node and the fifth junction; and
an eighth resistor coupled between the first node and the sixth junction;
wherein the equalizer is configured to provide a first additional output signal at the fifth junction, and a second additional output signal at the sixth junction; and
wherein the first voltage source is configured to adjust a common-mode voltage associated with the first additional output signal and the second additional output signal.

12. The receiver frontend of claim 11, wherein:
a combination of the first resistor, the third resistor, the fifth resistor, the seventh resistor, and a first termination resistor, has a resistance value equal to R, the first termination resistor coupled between the first junction and a second node;
a combination of the second resistor, fourth resistor, sixth resistor, and eighth resistor has a resistance value equal to R;
a combination of the first resistor, the third resistor, the fifth resistor, and the seventh resistor, has a resistance value greater than R; and
a combination of the second resistor, the fourth resistor, the sixth resistor, and the eighth resistor has a resistance value greater than R.

13. The receiver frontend of claim 11, further comprising a boost control structure, wherein the boost control structure comprises:
a first boost control circuit comprising a first array of cells;
wherein the first boost control circuit is configured to receive a first control signal that determines an on/off arrangement of the first array of cells, to receive the first output signal from the second junction and the second output signal from the fourth junction, and to generate a first boost control output signal at a seventh junction and a second boost control output signal at an eighth junction;
a second boost control circuit comprising a second array of cells;
wherein the second boost control circuit is configured to receive a second control signal that determines an on/off arrangement of the second array of cells, to receive the first additional output signal from the fifth junction and the second additional output signal from the sixth junction, and to generate a third boost control output signal at the seventh junction and a fourth boost control output signal at the eighth junction;
a first boost control resistor coupled between the seventh junction and a boost control common node; and
a second boost control resistor coupled between the eighth junction and the boost control common node.

14. A receiver frontend, comprising:
a first input junction for receiving a first input signal;
a second input junction for receiving a second input signal;

a first output junction;
a second output junction; and
circuitry configured to:
  perform equalization on the first input signal and the second input signal to establish a first output signal with a desired frequency response at the first output junction, and to establish a second output signal with a desired frequency response at the second output junction, and
  perform common-mode voltage adjustment on a common-mode voltage associated with the first output signal and the second output signal;
  wherein the circuitry is configured to perform the equalization on the first input signal by establishing a first additional output signal with a desired frequency response at a third output junction; and
  wherein the circuitry is configured to perform the equalization on the second input signal by establishing a second additional output signal with a desired frequency response at a fourth output junction.

15. The receiver frontend of claim 14, wherein the circuitry is further configured to perform common-mode voltage adjustment on a common-mode voltage associated with the first input signal and the second input signal.

16. The receiver frontend of claim 14, wherein the circuitry is further configured to perform termination of reflected signals associated with the first input signal and the second input signal.

17. The receiver frontend of claim 14, wherein the circuitry is further configured to provide electrostatic discharge (ESD) protection.

18. A signal processing method that involves a receiver frontend, comprising:
  performing equalization on a first input signal associated with an input channel and a second input signal associated with the input channel, wherein the first input signal is received at a first input junction of the receiver frontend and the second input signal is received at a second input junction of the receiver frontend, and wherein the equalization is performed so that a first output signal with a desired frequency response is established at a first output junction, and a second output signal with a desired frequency response is established at a second output junction;
  performing common-mode input voltage adjustment for a common-mode input voltage associated with the first input signal and the second input signal to establish a desired common-mode output voltage for the first output signal and the second output signal;
  performing termination of reflected signals associated with the first input signal and the second input signal; and
  providing electrostatic discharge protection to the receiver frontend.

* * * * *